(12) United States Patent
Riddiford

(10) Patent No.: US 6,679,565 B2
(45) Date of Patent: Jan. 20, 2004

(54) GAIN SCHEDULING FOR CONTROLLED FORCE APPLICATION

(75) Inventor: Bryan P. Riddiford, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/039,494

(22) Filed: Oct. 26, 2001

(65) Prior Publication Data

US 2003/0080612 A1 May 1, 2003

(51) Int. Cl.⁷ .............................. B60T 13/70; B60T 8/60
(52) U.S. Cl. .................. 303/15; 303/155; 303/DIG. 2; 701/70
(58) Field of Search ............................ 303/11, 15, 154, 303/155, 156, 157, 158, 162, 115.1, 115.2, 113.4, DIG. 1, DIG. 2; 701/70, 78

(56) References Cited

U.S. PATENT DOCUMENTS

| 4,743,072 A | * | 5/1988 | Brearley .................... 303/128 |
| 4,941,533 A | * | 7/1990 | Buller et al. ................ 166/246 |
| 4,986,614 A | * | 1/1991 | Ricker et al. ............ 188/181 R |
| 5,143,429 A | * | 9/1992 | Higashimata et al. .... 303/115.2 |
| 5,233,528 A | * | 8/1993 | Phipps et al. ............... 303/178 |
| 5,246,283 A | * | 9/1993 | Shaw et al. .............. 303/113.2 |
| 5,302,008 A | * | 4/1994 | Miyake et al. ........... 188/106 P |
| 5,312,172 A | * | 5/1994 | Takeuchi ................. 303/113.1 |
| 5,320,421 A | * | 6/1994 | Kade et al. .............. 303/115.2 |
| 5,362,135 A | * | 11/1994 | Riddiford et al. ............ 188/152 |
| 5,423,600 A | * | 6/1995 | Riddiford et al. ............ 188/156 |
| 5,570,289 A | * | 10/1996 | Stacey et al. ............. 280/5.504 |
| 5,588,716 A | * | 12/1996 | Stumpe ....................... 303/123 |
| 5,597,214 A | * | 1/1997 | Katagiri et al. ................ 303/10 |
| 5,667,286 A | * | 9/1997 | Hoying et al. ............... 303/140 |
| 5,749,633 A | * | 5/1998 | Baumgartner .............. 188/72.5 |
| 5,758,930 A | * | 6/1998 | Schiel et al. ................ 188/358 |
| 5,803,197 A | * | 9/1998 | Hara et al. ................... 180/248 |
| 5,836,659 A | * | 11/1998 | Feigel et al. ............. 303/113.4 |
| 6,000,507 A | * | 12/1999 | Bohm et al. ............ 188/1.11 E |
| 6,007,161 A | * | 12/1999 | Worsdorfer .............. 303/115.2 |
| 6,033,036 A | * | 3/2000 | Ruffer et al. ................ 188/358 |
| 6,149,247 A | * | 11/2000 | Hofmann et al. ......... 303/113.2 |
| 6,371,574 B1 | * | 4/2002 | Hageman et al. ......... 303/113.4 |
| 6,422,659 B2 | * | 7/2002 | Disser .................... 188/1.11 E |
| 6,450,588 B2 | * | 9/2002 | Grote et al. ............ 188/1.11 E |

FOREIGN PATENT DOCUMENTS

| EP | 0713818 A1 | * | 5/1996 |
| JP | 5278586 A | * | 10/1993 |

\* cited by examiner

Primary Examiner—Matthew C. Graham
Assistant Examiner—Melody M. Burch
(74) Attorney, Agent, or Firm—Scott A. McBain

(57) ABSTRACT

A force generating apparatus provides a force to a moving element upon receipt of an electrical force signal. The force generating apparatus includes a force applying element coupled to the moving element for applying the force to the moving element and an actuator coupled to the force applying element for actuation thereof in response to receiving the electrical force signal. The force generating apparatus further includes a controller for receiving a desired force actuation signal, determining a parameter of the desired force actuation signal, selecting a set of gains based on the parameter, applying the set of gains to a linear control function, determining the electrical force signal as a function of the linear control function, and sending the electrical force signal to the actuator.

19 Claims, 5 Drawing Sheets

GAIN SCHEDULING FOR CONTROLLED FORCE APPLICATION

FIELD OF THE INVENTION

The present invention relates to an improvement in force generating actuator control design and specifically improves control of force generation in non-linear operating regions.

BACKGROUND OF THE INVENTION

Hydraulic systems have typically been the basis for generating force to such vehicle systems as braking systems, clutches, etc., especially automotive braking systems. Hydraulic systems are used to convert fluid pressure into linear and/or mechanical motion. Such systems allow the source of the hydraulic pressure to be positioned remotely from the cylinders that affect the braking action. These systems comprise an actuator, such as a brake pedal, a reservoir fluid that is responsive to pressure applied by the actuator, (such as a master cylinder) and means for converting the hydraulic pressure to a braking force, generally fluid cylinders. Mechanical braking pressure is achieved by utilizing the force of the depression of the brake pedal by the driver to increase the pressure on the master cylinder. Such systems are typically accompanied by a vacuum boost that multiplies the force supplied to the brake pedal, throughout the braking operation. The increased pressure in the master cylinder is then transmitted through fluid lines to the fluid cylinders. The fluid cylinders operate the calipers thereby forcing the calipers and brake pads against the rotors and/or drums which slows the vehicle by frictional force.

Hydraulic systems of the above-described type have many disadvantages. These include the large amount of volume and mass that the master cylinder vacuum booster, ABS modulator and hydraulic line add to the completed vehicle. Installation of standard hydraulic braking systems is also complicated and labor intensive. Additionally, the large number of parts and installation also adds to repair and maintenance issues as individual parts reach the end of their useful life. Standard hydraulic braking systems have also become dependent on the vacuum boost to assist in braking operations. However, vehicles such as electric or hybrid vehicles do not produce vacuum as a by-product of the vehicle operation. Thus vacuum boost is not an option on such vehicles.

Electric brake systems have been developed in order to overcome some of the hydraulic system disadvantages. While there are many variant forms, including electrical hydraulic systems, such an electrically operated brake system is also referred to as a brake-by-wire brake system (BBW). BBW describes the ability to activate vehicle wheel brakes via an electric signal generated by an onboard processor/controller as a result of input signals thereto. Brake torque is applied to the wheels without direct mechanical interaction between the vehicle's brake pedal and the wheel brake.

One particular type of BBW system operates when a driver inputs a force to the brake pedal. A force sensor and/or travel sensor attached to the pedal transmits an electronic signal to an electronic controller, which in turn sends the signal to the self contained braking device typically located at each wheel of the vehicle. One such system is a hybrid system wherein electric signals are used to generate the type and amount of braking force required at each wheel of the vehicle with electrical wires rather than standard hydraulic brake lines. Located at each corner of the vehicle is a self-contained module that receives the electrical signal and mechanically brakes the vehicle. The self-contained module utilizes an individual motor that drives a ball screw piston assembly that, in turn, pressurizes hydraulic brake fluid to ultimately apply the brake caliper to a rotor at that corner of the vehicle. Another type system employs self-contained electric caliper modules that utilize an individual motor to directly apply the brake caliper to the rotor without the use of hydraulics. These types of modular BBW systems significantly reduce assembly cost. The individual modules can be separately assembled prior to the manufacture of the vehicle. The modules then only need to be bolted to the automobile during the assembly process and plugged in using standard electrical connections. Finally, the elimination of hydraulic lines stretching throughout the vehicle as well as the elimination of the master cylinder booster, and ABS modulator reduces space requirements within the engine compartment.

Due to the modularity of the BBW system, each of the individual components is preferably kept relatively small while still meeting a baseline brake response. Such a system keeps the BBW module a manageable size and does not overextend the existing electrical system on a vehicle. A modular BBW system thus works well in most brake system applications. All brake systems have linear and non-linear ranges of operation. Previous brake systems employing a central master cylinder have typically been designed such that the expected range of operation falls within its linear operating range. Since the desire is to minimize the physical size of BBW systems, these systems must operate over a wider area of the available range. Thus, in addition to the linear range of the system, these systems must also operate within the system's non-linear range.

As in a standard hydraulic brake system, an operator pressing an input device such as a brake pedal generates the initial input to the braking system. However, instead of creating a system-wide hydraulic pressure signal to the individual brakes, pressing the brake pedal in a BBW system generates a corresponding electric input signal to a controller. This electrical input signal, in turn, is applied to a control law and a corresponding electric output signal is sent from the controller to the individual brakes. Since the BBW brake system operates over an entire non-linear range, previous methods of control law utilization are not practical. If only a linear control law is utilized, then operation in the non-linear range will cause brake system to either overshoot or result in a decreased response. Conversely, if a non-linear control law is designed for application by the controller, throughput requirements and sophistication of the controller are significantly increased. Neither option furthers the objective to have a brake system that is simple to control over both linear and non-linear ranges of operation and maintains controller complexity at a minimum.

The present invention is aimed at one or more of the problems identified above.

SUMMARY OF THE INVENTION AND ADVANTAGES

In one aspect, the present invention includes a force generating apparatus for providing a force to a moving element upon receipt of an electrical force signal. The force generating apparatus includes a force applying element coupled to the moving element for applying the force to the moving element and an actuator coupled to the force applying element for actuation thereof in response to receiving the electrical force signal. The force generating apparatus further includes a controller for receiving a desired force actuation signal, determining a parameter of the desired force actuation signal, selecting a set of gains based on the parameter, applying the set of gains to a linear control function, determining the electrical force signal as a function of the non-linear control function, and sending the electrical force signal to the actuator.

Another aspect of the present invention is a method for providing a force to a moving element using a force generating apparatus. The force generating apparatus has a force applying element coupled to a moving element for applying the force and an actuator coupled to the force applying element for actuation thereof in response to receiving an electrical force signal from the controller, the method includes the steps of receiving a desired force actuation signal at the controller and then determining a parameter of the desired force actuation signal based at least in part on a desired force associated with the desired force actuation signal. After determining the parameter, a set of gains based on the determined parameter is selected and then applying the set of gains to a linear control function and determining therefrom an electrical force signal. Finally, the electrical force signal is sent to the actuator.

Yet another aspect of the present invention is a method for determining a mode of operation of a force generating apparatus. The force generating apparatus has a force applying element coupled to a moving element for applying the force and an actuator coupled to the force applying element for actuation in response to receiving an electrical force signal from the controller. The method includes the steps of receiving a desired force actuation signal at the controller and associating the desired force actuation signal with a desired force. Additional steps include sensing an actual force being applied to the force applying element and calculating the difference between the desired force and the actual force. Finally, the combination of the calculated difference and the desired force is associated with a force application mode.

These and other features and advantages of the present invention will be further understood and appreciated by those skilled in the art by reference to the following specification, claims, and appended drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE PREFERRED EMBODIMENT

Figure 1:
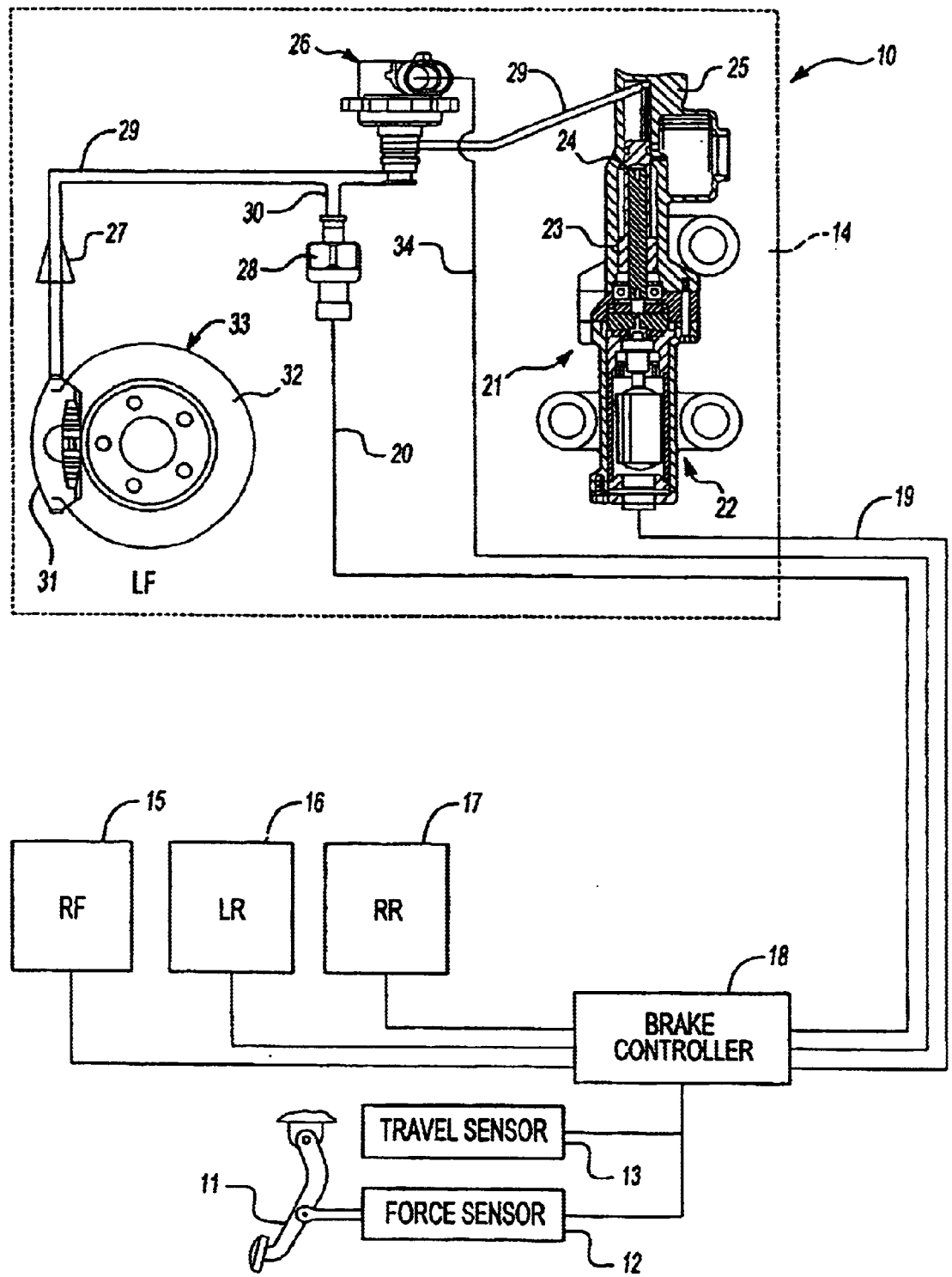
FIG. 1 is a schematic illustration of a braking system having self-contained electro-hydraulic modules at each wheel and including a controller incorporating the present invention.

Referring to the drawings, where the showings are for the purpose of illustrating the preferred embodiment of the invention only, and not for the purpose of limiting same, FIG. 1 schematically illustrates a force generating apparatus 10 embodied as a brake-by-wire braking system incorporating electro-hydraulic modules and a controller of the present invention. As shown the operator of the vehicle acts upon brake pedal 11. This force is applied to a force sensor 12 that in turn generates an electrical signal to a controller 18. Controller 18 processes the signal and sends a corresponding electrical signal to a left front corner brake module 14 of a vehicle. While FIG. 1 only shows the left front corner brake module 14, it will be appreciated that the brake signal is transmitted by controller 18 to all four corners of the vehicle, or each of the individual braking systems of the vehicle as the case may be.

A left front corner brake module 14 of FIG. 1 will now be described in detail. Corners 15, 16, and 17 are identical. Force sensor 12 and/or travel sensor 13 transmits a brake signal to an electronic control module 18 which via actuator signal line 19 is electrically connected to an actuator assembly 21 and specifically to a motor 22. Motor 22 drives a gear mechanism and ball screw assembly 23 that applies and releases a hydraulic piston 24 within an apply chamber 37 of an actuator body 25. A fluid line 29 extends from actuator body 25. Pressure transducer (or pressure sensor) 28 is located downstream of piston 24 and intersects primary line 29 via a port 30. During a normal brake apply and release displaced brake fluid flows within primary fluid line 29 and through outlet 27. The fluid pressure therein is transmitted to a force applying element 33 here shown as a wheel brake comprising a brake calipers 31 operating against rotor 32 in an apply and release manner to control the movement of a moving element such as a rotating wheel.

During normal braking operations, solenoid valve 26 is in a normally open state. Accordingly, the operator presses brake pedal 11 which is sensed by force sensor 12 and sends a signal or desired brake actuation signal to brake control module (or brake controller) 18. Brake controller 18 in turn generates a signal to actuate motor 22 and drive ball screw assembly 23 and hydraulic piston 24 to pressurize fluid line 29. Brake controller 18 receiving a pressure signal from pressure transducer 28 via line 20 monitors the fluid pressure within fluid line 29. Braking of wheel brake 33 is accomplished by piston 24 displacing fluid through the fluid line 29. When the operator releases brake pedal 11, brake controller generates a signal to reverse motor 22 and ball screw assembly 23 thereby relieving pressure from line 29 and wheel brake 33.

As can be seen from FIG. 1, an optional solenoid valve can be located along fluid line 29 downstream of piston 24 and upstream of pressure transducer 28. Solenoid valve 26 is normally open. When brake controller 18 senses a prolonged application of brake pedal 11, such as encountered when waiting at a stoplight, a close signal is transmitted to solenoid 26 via solenoid signal line 34. Solenoid 26 closes and thereby maintains caliper 31 and fluid line 29 downstream of solenoid 26 in a pressurized state allowing the load on actuator 21 to be removed until brake controller 18 commands a new braking signal. When solenoid 26 is not present in brake system 10, electrical power continues to be applied to motor 22 thereby maintaining a desired pressure in fluid line 29.

Figure 2:
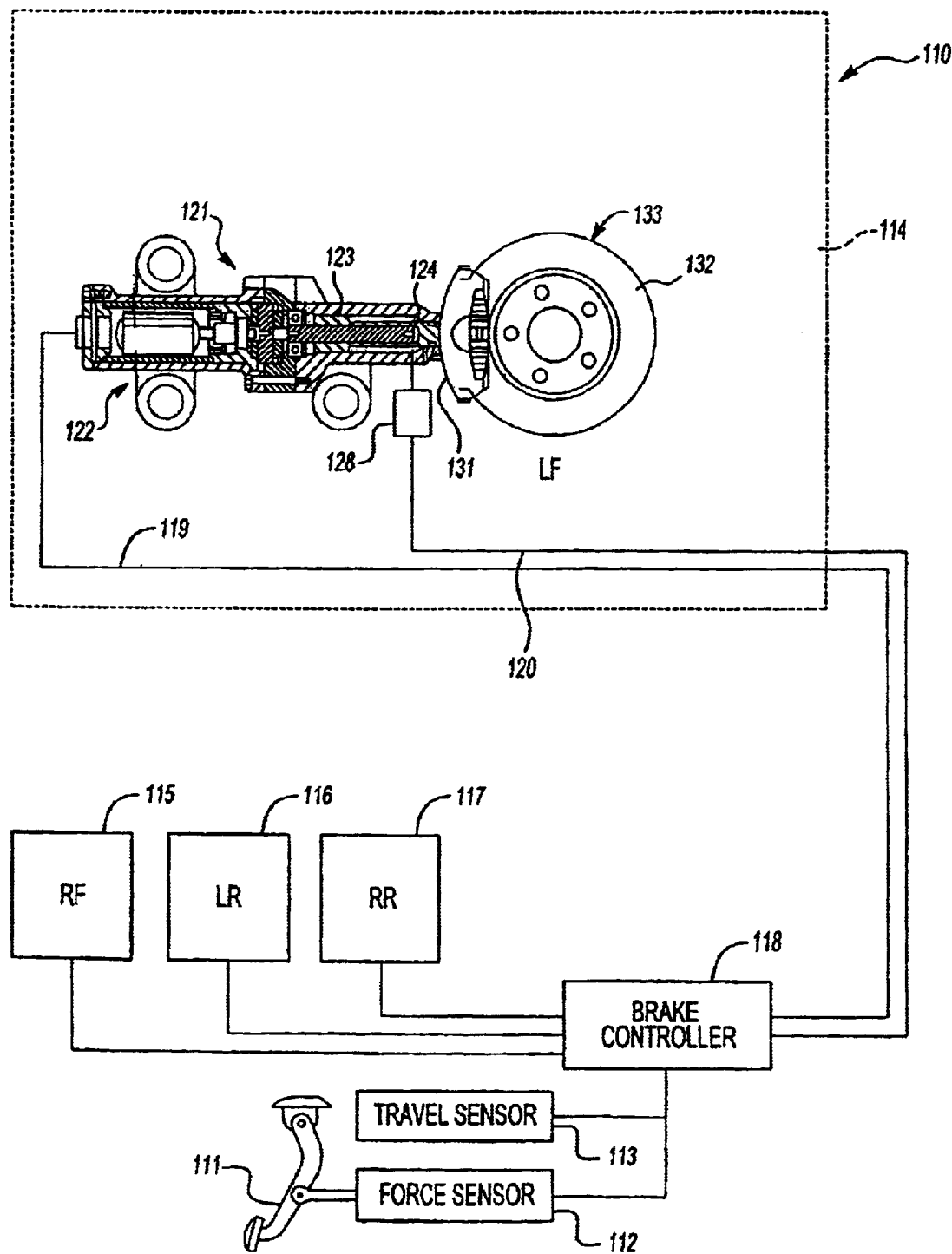
FIG. 2 is a schematic illustration of a braking system having self-contained electrically operated modules at each wheel and including a controller incorporating the present invention.

Turning now to FIG. 2, an alternate embodiments of a dry interface corner braking system is shown generally at 110.

Braking system 110 incorporates an electromechanical actuator 121 coupled to a brake 133 and a controller 118 of the present invention. As shown, the operator of the vehicle acts upon brake pedal 111, and as in system 10 described above, the force applied to the brake pedal 111 in turn is applied to force sensor 112. Force sensor 112 and/or travel sensor 113 generates an electrical signal to a controller 118. Controller 118 processes the signal from the force and/or travel sensor 112,113 and a signal from pressure sensor 128 received via line 120 and sends a corresponding electrical signal to a left front corner brake module 114 of the vehicle. Corners 115, 116, and 117 are identical to brake module and are controlled in a like manner. Electromechanical actuator 121 includes a motor 122 which is electrically connected to brake controller 118 for receiving an electrical brake signal transmitted by brake controller 118. Motor 122 drives a gear mechanism and ball screw assembly 123 that mechanically advances and reverses link 124. Link 124 is coupled to wheel brake 133 for actuation of the wheel brake. Specifically, link 124 is coupled to brake caliper 131 such that when ball screw assembly 123 advances and releases link 124, caliper 131 is correspondingly applied and released from braking contact with rotor 132 mounted to the wheel to the vehicle. Those skilled in the art will readily recognize that brake drums and brake shoes can be substituted for the calipers and rotors discussed herein as another embodiment of a brake by wire system.

Figure 3:
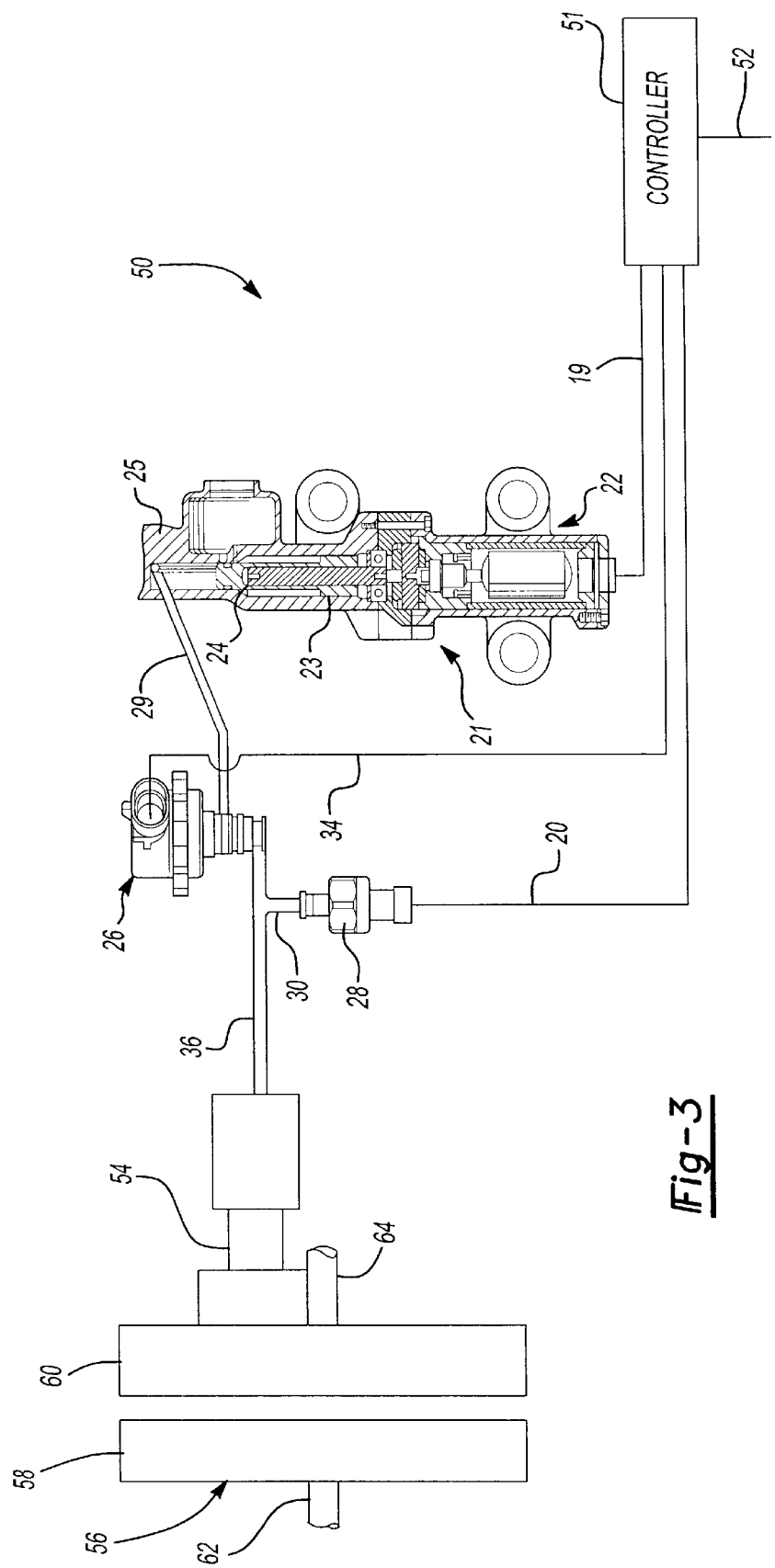
FIG. 3 is a schematic illustration of an electrically controlled transmission system.

Referring now to FIG. 3, a transfer case actuator system 50 for controlling the torque split between the front and rear drive axles of a four-wheel drive vehicle is shown. Actuator 21, solenoid valve 26, transducer 28 and their operation and respective interconnections are the same as for brake system 10, and are thus numbered the same. A controller 51 receives a signal on line 52 for engagement or disengagement of transfer clutch 56 wherein controller 51 sends the desired force actuation signal to actuator 21. Fluid line 36 interconnects solenoid 26 with piston 54. As fluid is forced into line 36, piston 54 in turn acts upon plate 60 of transfer clutch 56, to force plate 60 into operational engagement with plate 58, thus transferring torque from input shaft 62 to output shaft 64.

Turning now to operation of controllers 18, 51, and 118, for purposes herein all controllers operate in the same manner and thus for convenience only the operation of controller 18 will be discussed. Those skilled in the art will recognize that the methods applied to controller 18 can also be utilized in controllers 51 and 118. Controller 18 receives electrical inputs that are generated as a result of the vehicle operator depressing brake pedal 11. Brake controller 18 then takes the electrical signal which is a desired brake actuation signal and calculates the appropriate electrical brake signal to motor 22 for appropriate actuation of brake 33. Brake module 14 may not operate in a linear fashion, and for appropriate control thereof brake controller 18 would typically require application of an appropriate non-linear control law. However, since application of non-linear control laws add significant complexity to operation of brake controllers 18 it has become desirable to adapt and apply linear control laws such as Proportional Integral Derivative (PID) or other standard control laws that are well known in control law theory.

In order to use a linear control law in a non-linear operating region, the non-linear operation must be approximated as a linear function. Since approximating the entire non-linear function as a linear function with a single set of gains applied thereto necessarily creates a high degree of error, brake controller 18 applies the linear control law to a specific region associated with a particular brake operational mode. By application in this manner, brake controller 18 more closely approximates the non-linear characteristics of the braking system with a series of linear approximations, each linear approximation being associated with a specific braking mode. An appropriate braking is then determined based upon the linear approximation for that mode and is sent to the brake module.

Figure 4:
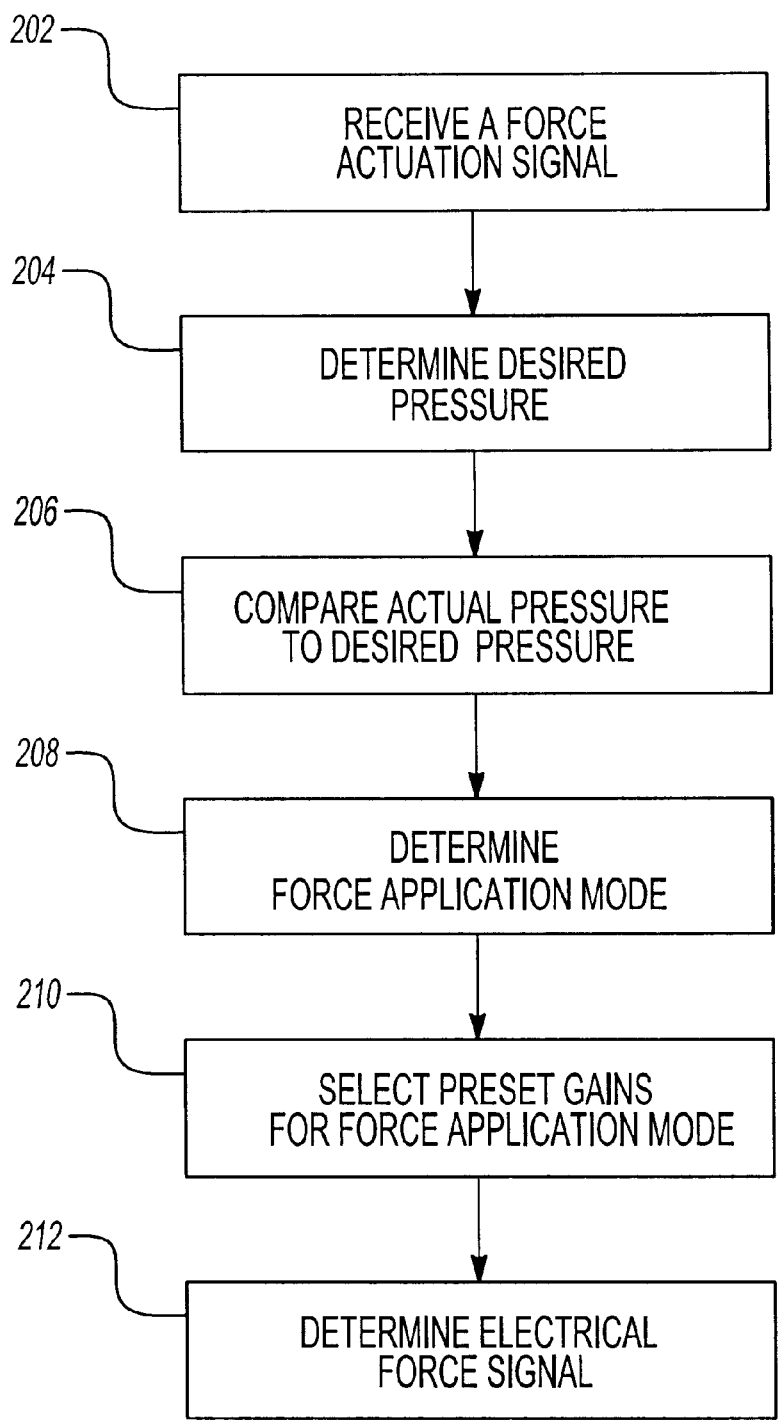
FIG. 4 is a flowchart of a method for operating a force generating apparatus, according to an embodiment of the present invention.

Turning now to FIG. 4, an embodiment thereof shows the process of receiving a force actuation signal and determining therefrom an electrical force signal to be transmitted to the brake module 14. In a first control block 202 the brake controller 18 receives a force actuation signal. In a second control block 204, the force actuation signal is translated into a desired pressure or force. Control block 206 represents the comparison of the desired pressure or force to the actual pressure or force being applied to the force applying element. The actual pressure is a function of the hydraulic pressure sensed by pressure transducer 28 in brake module 14. The actual pressure is then transmitted to brake controller 18. The controller compares the actual pressure to the desired pressure by calculating the difference between the two pressures, and then establishing the differences as an error.

In control block 208 the controller determines the specific force application mode based upon the error and the desired pressure. The desired pressure establishes whether the system is being operated in the low, medium, or high regions by establishing predefined bracketed thresholds of pressures or forces for each region. Similarly, if the error is greater than a threshold error the force applying element or brake is designated as being in an apply mode; if the pressure error is less than the error threshold the system is in a release mode; and if the pressure error is approximately equal to the threshold error the system is in a normal mode. Thus, a total of nine force application modes (low apply, low release, low normal, medium apply, medium release, medium normal, high apply, high release, or high normal) can be established in this manner. Those experienced in the art will readily recognize that the regions can be divided into more or fewer sub-regions for the establishment of a greater or fewer number of modes.

Controller 18 includes a table of preset gains for application to the linear control law. Each of the individual gains in a set are established to most closely approximate the linear control law in that region associated with the particular mode of brake operation. Thus, upon determining the force application mode, the controller selects the preset gains for that mode (control block 210) and applies these gains to the linear control law therein determining the electrical force signal to be sent to the brake module 14 (control block 212).

Brake module 14 is not instantly responsive to the electrical brake signal sent by the controller to the brake module. There is a certain degree of lag time during which the brake module 14 receives the electrical signal, activates the motor in actuator 21, and applies the commanded force to the force applying element. In order to prevent conflicting signals from being sent to brake module 14 within the response time for the first sent signal, a timing function is introduced to the controller operation.

Figure 5:
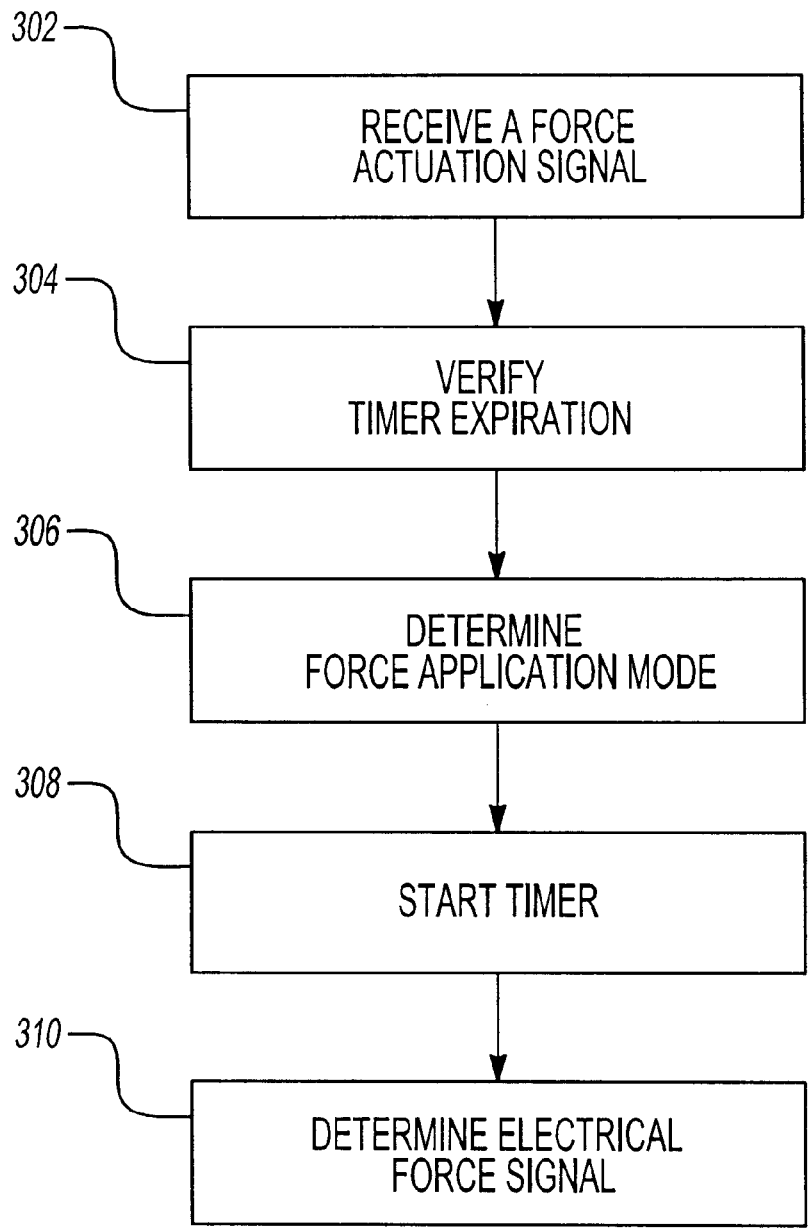
FIG. 5 is a flowchart of a method for determining the operations region of the force generating apparatus and the corresponding gains to be applied to the linear control law for that region.

FIG. 5 shows an application of the timing function. In control block 302 the controller receives a force actuation signal, in control block 304 the controller verifies that the timing function has expired, and then in control block 306 the force application mode is determined as discussed above. In control block 308 the timer is started after the force application mode has been determined, and then in control block 310 the electrical force signal to be sent to brake module 14 or 114 is determined. The timing function from control block 308 continues to run for a predefined time period that is dependent upon the response characteristics of individual brake module 14. In the disclosed embodiments, the timing function is on the order of 20 milliseconds, although those experienced in the art will recognize that different time durations may be selected based upon the needs and requirements of the system to which it is applied. The electrical signal to be sent to the brake module is determined and maintained until the timing function has expired. In this manner, the controller 18 will maintain the determined braking mode for the duration of the timing function. Upon expiration of the timing function, a new mode can be determined and a new braking signal is determined and sent to the brake actuator.

In the foregoing description, the invention has been described with reference to the preferred embodiment. Those skilled in the art will readily appreciate that modifications may be made to the invention without departing from the concepts disclosed herein. Such modifications are to be considered as covered by the following claims, unless the claims by their language expressly state otherwise.

The invention claimed is:

1. A force generating apparatus for providing a force to a moving element upon receipt of an electrical force signal, comprising:
   a force applying element coupled to the moving element for applying the force to the moving element;
   an actuator coupled to the force applying element for actuation thereof in response to receiving the electrical force signal;
   a transducer coupled to said actuator for sensing a pressure applied to said force applying element and producing an actual pressure signal; and,
   a controller for receiving a desired force actuation signal and the actual pressure signal, determining a desired pressure as a function of the desired force actuation signal and responsively determining an operating region as a function of the desired pressure, said operating region being defined by predefined bracketed thresholds of desired pressure, for comparing the desired pressure with the actual pressure and responsively determining an error signal, comparing said error signal with a predetermined threshold and responsively determining a brake mode, and for selecting a set of gains based on said operating region and said brake mode, applying said set of gains to a linear control function, determining said electrical force signal as a function of said linear control function, and sending said electrical force signal to said actuator.

2. A force generating apparatus according to claim 1 wherein said force applying element comprises a caliper and a rotor.

3. A force generating apparatus according to claim 1 wherein said operating region is one of low desired pressure, medium desired pressure, and high desired pressure.

4. A force generating apparatus according to claim 3 wherein said actuator includes a motor responsive to said electrical force signal and a gear-ball screw assembly coupled to said motor.

5. A force generating apparatus according to claim 4 wherein said actuator defines an apply chamber and further includes a piston within said apply chamber and coupled to said gear-ball screw assembly for selectively increasing and decreasing a fluid pressure therein.

6. A force generating apparatus according to claim 5 wherein said caliper is fluidically coupled to said apply chamber and further is responsive to the increasing and decreasing fluid pressure.

7. A force generating apparatus according to claim 6 further including a solenoid between said apply chamber and said caliper for selectively isolating and connecting said caliper from said fluid pressure in said apply chamber.

8. A force generating apparatus according to claim 4 wherein said gear-ball screw assembly is mechanically coupled to said caliper.

9. A force generating apparatus according to claim 1 wherein said operating region is one of low, medium and high.

10. A force generating apparatus according to claim 1 wherein said brake mode is one of apply, release and normal.

11. A force generating apparatus according to claim 1 wherein said operating region and said brake mode define a force application mode.

12. A force generating apparatus according to claim 11 wherein said controller determines said force application mode primarily after expiration of a timer delay.

13. A force generating apparatus according to claim 1 wherein said force applying element comprises a shoe and a drum.

14. A method for providing a force to a moving element using a force generating apparatus, the force generating apparatus having a force applying element coupled to the moving element for applying the force and an actuator coupled to the force applying element for actuation thereof in response to receiving an electrical force signal from a controller, the method including the steps of:
   receiving a desired force actuation signal at the controller;
   sensing an actual pressure of the force generating apparatus;
   determining a desired pressure as a function of the desired force actuation signal;
   responsively determining an operating region as a function of the desired pressure, said operating region being defined by predefined bracketed thresholds of desired pressure,
   comparing the desired pressure with the actual pressure signal and responsively determining an error signal;
   comparing said error signal with a predetermined threshold and responsively determining a brake mode;
   selecting a set of gains based on said operating region and said apply brake mode;
   applying the set of gains to a linear control function and determining therefrom an electrical force signal; and
   sending the electrical force signal to the actuator.

15. The method according to claim 14 including the step of determining a force application mode of the force generating apparatus as a function of the operating region and the apply brake mode.

16. The method according to claim 15 further including the step of:
   associating the force application mode with the selected set of gains.

17. The method according to claim 16 wherein said step of comparing the desired pressure with the actual pressure includes the step of:
   calculating a difference between the desired pressure and the actual pressure.

18. The method according to claim 17 wherein:

the selected predefined set of gains are associated with a particular combination of the desired pressure and the calculated difference.

19. The method according to claim 15 further including after said receiving step, the step of:

starting a timing function in the controller; and after said sending step further including the step of:

maintaining the determined force application mode until expiration of the timing function.

* * * * *